United States Patent Office.

THOMAS W. CARRICO, OF SAN ANTONIO, TEXAS.

PROCESS OF MAKING CONCRETE WALLS, BLOCKS, &c.

SPECIFICATION forming part of Letters Patent No. 319,390, dated June 2, 1885.

Application filed September 3, 1884. (No specimens.)

*To all whom it may concern:*

Be it known that I, THOMAS W. CARRICO, of San Antonio, in the county of Bexar and State of Texas, have invented a new and Improved Process of Making Concrete Walls, Blocks, &c., of which the following is a full, clear, and exact description.

My invention consists in the process hereinafter specified of making concrete walls for buildings, blocks for sills, steps, and walks, and concrete work generally, by which process the work is made more enduring and better in every respect than by the usual process of mixing the beton in molds and ramming it.

In carrying out my invention I first take broken stone, brickbats, gravel, shells, granite spalls, or any similar coarse materials, and subject them to a bath or soaking in water to thoroughly remove the dirt and other foreign matters which might prevent adhesion. This may be carried out in any suitable receptacle, and the materials so washed are then placed in the molds or trenches, the stones, &c., being placed as near as possible to rest on their wider faces, or as they would naturally if not in mass. I then take one part, by measure, of cement for good quality of work, or of lime when less strength is required, and two parts of sharp sand, and add to these sufficient water to make a thin grout, which is then poured into the molds or trenches containing the broken stone, spalls, or other materials, as mentioned, until the grout fills all the interstices, so as to form a solid mass.

To facilitate the working in of the grout, the stones are to be shaken with a fork or tool. The coarse materials are soaked or washed on suitable elevated bars or grates in a bath, to remove the dirt, so that the foreign matter will not prevent adhesion, and when washed I then place the material in molds, the stones to rest on their wider faces. Cement, lime, and two parts of sharp sand are then poured in, and I then add water to make a thin grout, which is then poured into the molds in which rest the stone, brick, &c., until the interstices are filled, thus forming a solid block. The mass is shaken by means of a fork or other implement while the grout is being poured in until the stones find their natural bed. When dry, the mass will be thoroughly bonded in every part. The usual beating or hammering injures the blocks. By placing the stones in their natural position the surface is much smoother and the blocks more symmetrical than when thrown in promiscuously. Thus a block of superior quality is produced while the grout is being poured until all the stones find their natural bed. When dry, the concrete will be solid and thoroughly bonded in every part. The proportion of stone, spalls, &c., can be varied, and it is to be observed that whatever proportion the stones bear to the whole mass the binding compound is not varied thereby in its own proportions. With the ordinary method of mixing the beton in beds or boxes and throwing it into the trench or mold, when the stone varies in size, the proportions change, so that a wall of uniform strength cannot be made. Further than that, the cement commences to set immediately, and the ramming or pounding usually practiced injures the adhesion, and even if done at once the adhesion in the previous courses is loosened. The walls or blocks are also much stronger from the rock or stone resting naturally, instead of being thrown in promiscuously, and the surfaces of the wall are smooth, so that they can be readily finished to present a handsome appearance.

The proportion of sand to the cement or lime may be varied according to the strength required in the finished concrete and the purposes for which it is used.

By using lime a cheap class of work is produced, and in some cases the stones may be thrown in without special care. I prefer to wet down the walls for a few days after building, to prevent too rapid setting.

Having thus described my invention, I claim as new and desire to secure by Letters Patent—

1. The hereinbefore-described process of making concrete walls and blocks, which consists in first cleaning the broken stone, spalls, bats, or other material, then placing them in the trench or mold, and then filling the interstices and forming a solid mass by pouring in a thin grout composed of cement or lime and sand, and, finally, removing the sides of the mold and leaving the block to stand alone, as specified.

2. The hereinbefore-described process of forming concrete walls and blocks, which consists in washing the stones, spalls, bats, or other material, then placing them in a mold in as near natural positions as possible, and then binding them by a filling of thin grout, and then removing the walls of the mold and leaving the block to stand alone, substantially as described.

3. In the manufacture of concrete, the preliminary process of washing or soaking the broken stone or other material by supporting said material on a grating or bars, which allows the dirt to be thoroughly washed from said material, for the purpose specified.

THOMAS W. CARRICO.

Witnesses:
WM. BENSON,
JOHN J. STEVENS.